US010611672B2

(12) United States Patent
Hwang et al.

(10) Patent No.: US 10,611,672 B2
(45) Date of Patent: *Apr. 7, 2020

(54) BOROSILICATE GLASS, LIGHT GUIDE PLATE COMPRISING THE SAME AND FABRICATING METHODS THEREOF

(71) Applicant: LG CHEM, LTD., Seoul (KR)

(72) Inventors: Du-Sun Hwang, Daejeon (KR); Hyun-Jin Shim, Daejeon (KR); Chang-Hee Lee, Daejeon (KR); Byung-Kook Choi, Daejeon (KR); Jun-Bo Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/762,410

(22) PCT Filed: Apr. 18, 2017

(86) PCT No.: PCT/KR2017/004151
§ 371 (c)(1),
(2) Date: Mar. 22, 2018

(87) PCT Pub. No.: WO2017/191913
PCT Pub. Date: Nov. 9, 2017

(65) Prior Publication Data
US 2018/0265399 A1     Sep. 20, 2018

(30) Foreign Application Priority Data

May 3, 2016 (KR) .................. 10-2016-0054886
Mar. 31, 2017 (KR) .................. 10-2017-0041953

(51) Int. Cl.

| | | |
|---|---|---|
| *C03C 3/089* | (2006.01) | |
| *C03B 18/02* | (2006.01) | |
| *C03C 3/11* | (2006.01) | |
| *F21V 8/00* | (2006.01) | |
| *C03C 3/091* | (2006.01) | |
| *G02F 1/1335* | (2006.01) | |
| *C03B 25/08* | (2006.01) | |
| *C03B 25/02* | (2006.01) | |
| *G02B 5/02* | (2006.01) | |
| *G02B 5/30* | (2006.01) | |

(52) U.S. Cl.
CPC .............. *C03C 3/089* (2013.01); *C03B 18/02* (2013.01); *C03B 25/025* (2013.01); *C03B 25/08* (2013.01); *C03C 3/091* (2013.01); *C03C 3/11* (2013.01); *G02B 6/0011* (2013.01); *G02B 6/0065* (2013.01); *G02F 1/133615* (2013.01); *G02B 5/0278* (2013.01); *G02B 5/3033* (2013.01); *G02B 6/0043* (2013.01)

(58) Field of Classification Search
CPC ................................ C03C 3/089; C03C 3/091
See application file for complete search history.

(56) References Cited

U.S. PATENT DOCUMENTS

| | | | |
|---|---|---|---|
| 4,259,118 A | 3/1981 | Sack | |
| 5,459,110 A | 10/1995 | Brix | |
| 5,599,753 A | 2/1997 | Watzke et al. | |
| 10,207,950 B2 * | 2/2019 | Lee | .............. C03C 3/083 |
| 2007/0232478 A1 | 10/2007 | Fechner et al. | |
| 2015/0368146 A1 | 12/2015 | Ellison et al. | |
| 2016/0159681 A1 | 6/2016 | Lambricht et al. | |
| 2017/0052311 A1 | 2/2017 | Lautenschlager et al. | |
| 2018/0170795 A1 * | 6/2018 | Kajihara | ................ C03C 3/085 |
| 2018/0364415 A1 * | 12/2018 | Shim | ...................... C03C 3/091 |

FOREIGN PATENT DOCUMENTS

| | | | | |
|---|---|---|---|---|
| CA | 2193999 | | 10/1996 | |
| DE | 4306004 | | 9/1993 | |
| DE | 19515608 | | 8/1996 | |
| EP | 2871408 | | 5/2015 | |
| JP | H03-218940 | | 9/1991 | |
| JP | 2015072896 | | 4/2015 | |
| KR | 10-2003-0056840 | | 7/2003 | |
| KR | 10-1369143 | | 3/2014 | |
| KR | 10-2015-0087203 | | 7/2015 | |
| KR | 10-2016-0045681 | | 4/2016 | |
| KR | 10-2016-0054886 | | 5/2016 | |
| KR | 10-2017-0041953 | | 4/2017 | |
| WO | 2010076445 | | 7/2010 | |
| WO | WO-2014077114 A1 * | 5/2014 | ............ C03C 3/091 |
| WO | WO-2015011040 A1 * | 1/2015 | ............ C03C 3/091 |
| WO | WO-2017030110 A1 * | 2/2017 | ............ C03C 3/085 |

OTHER PUBLICATIONS

Varshneya, Arun K., Fundamentals of Inorganic Glasses, 1994, Academic Press, Inc., pp. 302-308. (Year: 1994).*

* cited by examiner

*Primary Examiner* — Elizabeth A. Bolden
(74) *Attorney, Agent, or Firm* — Dentons US LLP

(57) ABSTRACT

Provided is glass with high temperature stability, a low coefficient of thermal expansion and a high mechanical strength, a light guide plate including the glass to replace the conventional PMMA and metal frame, and fabricating methods thereof. The glass according to the present disclosure is borosilicate glass containing 75~85 wt % of $SiO_2$, 5~15 wt % of $B_2O_3$, 0~5 wt % of $Al_2O_3$, $R_2O$ 1~7 wt % where R is at least one of Li, Na and K, and <0.005 wt % of $Fe_2O_3$ and having the redox ratio 0.5 or more. This glass maintains luminance and has an excellent color difference reduction effect when used in a light guide plate.

16 Claims, 14 Drawing Sheets

BOROSILICATE GLASS, LIGHT GUIDE PLATE COMPRISING THE SAME AND FABRICATING METHODS THEREOF

RELATED APPLICATIONS

This application is a National Stage Application of International Application No. PCT/KR2017/004151 filed on Apr. 18, 2017, which claims priority to and the benefit of Korean Patent Application No. 10-2016-0054886 filed in the Republic of Korea on May 3, 2016 and Korean Patent Application No. 10-2017-0041953 filed in the Republic of Korea on Mar. 31, 2017, all of which are incorporated herein in their entirety by reference for all purposes as if fully set forth herein.

TECHNICAL FIELD

The present disclosure relates to glass and its use and fabrication, and more particularly, to borosilicate glass, a light guide plate comprising the same and fabricating methods thereof.

BACKGROUND ART

Generally, a liquid crystal display (LCD) is widely used in display devices such as laptop computers, desktop computers and TVs because the advantages are that it achieves lightweight, compact design and low power consumption. However, a LCD is not a device that produces light by itself, and is a light receiving device requiring a LCD screen as well as a backlight unit.

FIG. 1 is a schematic cross-sectional view of a LCD according to the related art.

Referring to FIG. 1, a conventional LCD 1 includes a liquid crystal panel 10, a backlight unit 20, a cover bottom 30, a guide panel 40, and a top case 50.

The liquid crystal panel 10 includes a thin film transistor substrate 12 and a color filter substrate 14 bonded to each other with a liquid crystal layer interposed between. Furthermore, polarizing members 16, 18 may be attached to a lower surface and an upper surface of the liquid crystal panel 10. Furthermore, the backlight unit 20 includes a reflection sheet 21, a light source 23 that provides light to the liquid crystal panel 10, a light guide plate 25, multiple optical sheets 27, and a housing 29 that supports the light source 23.

The cover bottom 30 has a receiving space inside to receive the light source 23, the reflection sheet 21, the light guide plate 25, and the optical sheets 27 with supporting the guide panel 40. The guide panel 40 supports the liquid crystal panel 10, and includes a panel support that supports the liquid crystal panel 10 and sidewalls that cover the backlight unit 20 as shown in FIG. 1. The top case 50 covers not only the edges of the upper surface of the liquid crystal panel 10 but also the side surfaces of the guide panel 40 and the cover bottom 30.

Here, the light guide plate 25 directs light from the light source 23 toward the liquid crystal panel 10, and is primarily made of polymer such as polymethylmethacrylate (PMMA) or polycarbonate (PC). The light guide plate 25 is a key component of the backlight unit 20 to create a surface light source by uniformly diffusing light from the side light source 23 upwards with minimum light loss.

However, PMMA primarily used for the light guide plate 25 in the related art deforms and produces harmful volatile organic compounds at high temperature (90° C.). Furthermore, PMMA has a high coefficient of thermal expansion (CTE) of about $50\sim100\times10^{-6}$/K, which is a limitation in reducing the width of a bezel or a non-display area of the liquid crystal panel 10. In addition, due to polymer having low mechanical strength, the guide panel 40 or a metal frame is additionally used to enhance the mechanical strength.

Accordingly, there is the demand for a light guide plate that is resistant to deformation and does not produce toxic gas in a high temperature environment during use, ensuring high-temperature stability, has a low coefficient of thermal expansion, shows high mechanical strength, eliminating the need for a metal frame, and is advantageous for production of thinner display devices, and its fabrication.

Currently, many studies are being made on new products using a glass light guide plate. Generally, glass has better mechanical properties and thermal durability than polymer, but glass absorbs more light than polymer due to the properties of the material itself, failing to efficiently transmit light from a backlight unit.

DISCLOSURE

Technical Problem

The present disclosure is directed to providing glass that has high-temperature stability, a low coefficient of thermal expansion, high mechanical strength, and a small color difference while maintaining high luminance when used for a light guide plate.

The present disclosure is further directed to providing a new light guide plate using the glass that can replace conventional PMMA and metal frame.

The present disclosure is further directed to providing a method for fabricating the glass.

Technical Solution

To achieve the object, the present disclosure proposes borosilicate glass containing 75~85 wt % of $SiO_2$, 5~15 wt % of $B_2O_3$, 0~5 wt % of $Al_2O_3$, 1~7 wt % of $R_2O$ where R is at least one of Li, Na and K, and <0.005 wt % of $Fe_2O_3$, wherein the borosilicate glass has a redox ratio of 0.5 or more.

Preferably, the redox ratio of the borosilicate glass is 0.5~0.8.

To adjust the redox ratio, the borosilicate glass may further contain 0.1 wt % or less of carbon. As another example, the borosilicate glass may further contain 0.001~0.05 wt % of sulfur.

According to an embodiment, the borosilicate glass does not substantially contain transition metal compound for adjusting a color difference. The transition metal compound is NiO, CuO, $Cr_2O_3$, $V_2O_5$ or MnO.

Furthermore, in the borosilicate glass, $K_2O>0.1$ wt %.

Furthermore, the borosilicate glass may further contain 0~0.5 wt % of $SO_3$ or Cl as a fining agent.

The borosilicate glass has visible light (380 nm~780 nm) transmittance that is higher than or equal to that of a polymer light guide plate or is 92% or more on the basis of 2 mm the thickness. Furthermore, the borosilicate glass has the refractive index of 1.49 or less, and preferably 1.475 or less, and the coefficient of thermal expansion of $10\times10^{-6}$/K or less, and preferably $5\times10^{-6}$/K or less. The density of the borosilicate glass may be 2.0 g/cm³ or more, and preferably 2.2 g/cm³ or more, and may be 2.5 g/cm³ or less. The glass transition temperature may be 500° C. or more, and preferably 520° C. or more. For convenience of production, the working temperature of the borosilicate glass (temperature at the viscosity of $10^4$ dPas) is preferably 1,270° C. or less, and more preferably 1,250° C. or less. As the borosilicate glass is used to impart superior mechanical rigidity over the conventional polymer light guide plate, the elastic modulus (Young's modulus) of the borosilicate glass may be 60 GPa or more, and preferably 65 GPa or more. The Poisson's ratio (a ratio between lateral and longitudinal deformation) of the borosilicate glass may be 0.23 or less, and preferably 0.2 or less. The flexural strength of un-strengthened mother glass may be at least 20 MPa or more, and preferably 25 MPa or more. Glass obtained by chemically strengthening the borosilicate glass of the composition is also included in the scope of the present disclosure.

To achieve another object, a light guide plate according to the present disclosure includes the borosilicate glass according to the present disclosure.

Preferably, the light guide plate has a color difference of +0.015~−0.015 at a site 500 mm away from a light-input portion (i.e., path length 500 mm), and more preferably, a color difference of +0.010~−0.010 (path length 500 mm).

Preferably, the light guide plate has the thickness of 1.4 mm or more and 2 mm or less. Furthermore, the light guide plate of the present disclosure does not need to use an optical film for color correction. In addition, the light guide plate may have a pattern structure for scattering of incident light.

The borosilicate glass according to the present disclosure may be fabricated by mixing and melting glass raw materials with the above formula and carrying out forming of the melted glass raw materials by a float method using a molten tin float bath.

As a preferred example, the method may include annealing the borosilicate glass while maintaining the redox ratio of the melted glass raw materials, after carrying out forming. The annealing rate may be 10° C./min~40° C./min. Furthermore, the method may further include chemically strengthening the borosilicate glass.

A display device including the light guide plate according to the present disclosure is also proposed. The display device is preferably a LCD.

Advantageous Effects

According to the present disclosure, borosilicate glass with composition having high-temperature stability, high mechanical properties enough to replace the conventional polymer light guide plate and metal frame, smaller thickness, and excellent optical properties is fabricated, and a light guide plate using the borosilicate glass is fabricated.

Because of having high rigidity, the borosilicate glass according to the present disclosure can eliminate a cover bottom, or its alternative, an aluminum composite material (ACM) or GCM back cover conventionally used to maintain the mechanical rigidity of a LCD module. Alternatively, a film, polymer, plastic, or metal can be used in place of the conventional ACM and GCM.

Furthermore, because of having a low coefficient of thermal expansion, the borosilicate glass is less likely to expand in response to external temperature changes, exhibiting little or no deformation, which is advantageous for reduction of bezel width.

Accordingly, the borosilicate glass according to the present disclosure can be used in the applications requiring glass with high-temperature stability, a low coefficient of thermal expansion and high mechanical strength, and preferably can be fabricated for a light guide plate of LCDs.

Particularly, the present disclosure provides glass with low iron content controlled to maintain luminance of a light guide plate and the redox ratio controlled to reduce a color difference. When a light guide plate comprising the glass is used in a LCD module, luminance and color difference performance more than the level of conventional polymer is satisfied.

BRIEF DESCRIPTION OF THE DRAWINGS

The accompanying drawings illustrate preferred embodiments of the present disclosure, and together with the detailed description, serve to provide a further understanding of the technical aspects of the present disclosure, and thus, the present disclosure should not be construed as being limited to the disclosure stated in the drawings.

MODE FOR CARRYING OUT THE INVENTION

Figure 1:
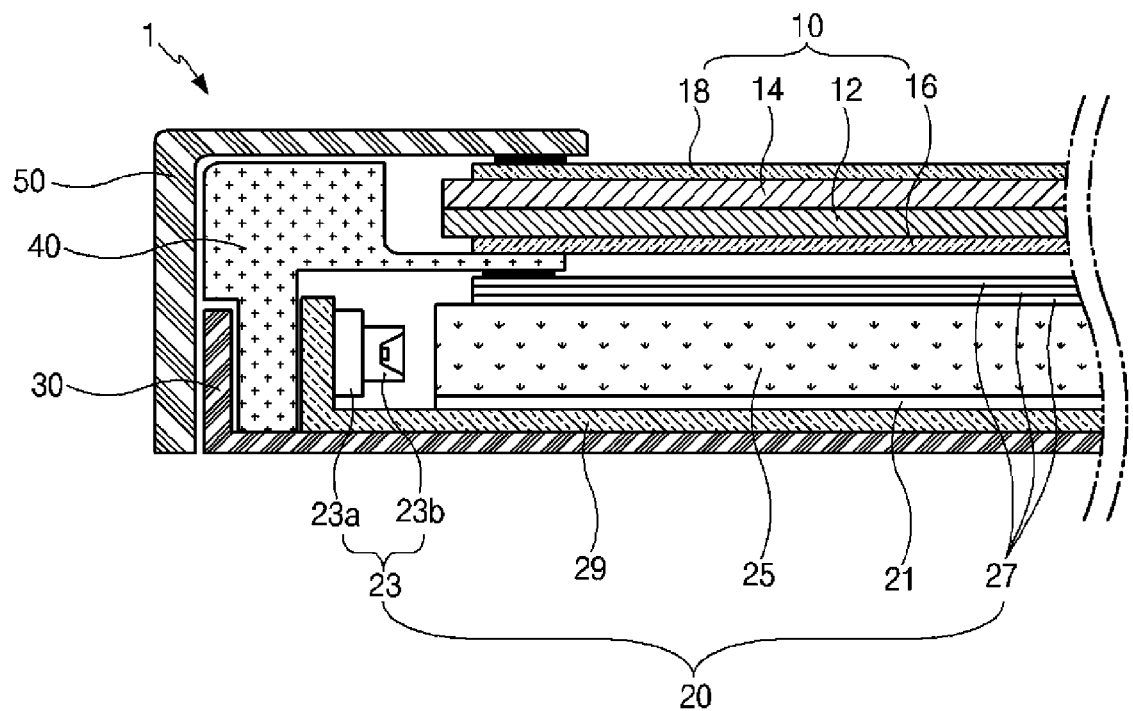
FIG. 1 is a schematic cross-sectional view of a LCD according to the related art.

Hereinafter, the preferred embodiments of the present disclosure will be described in detail with reference to the drawings. However, the present disclosure is not limited to the disclosed embodiment and will be embodied in different forms, and rather, these embodiments are provided to render the disclosure of the present disclosure complete and to help those skilled in the art fully understand the scope of the present disclosure. In the drawings, like reference numerals denote like elements.

It should be understood that all the disclosed ranges include the range of starting and ending values and any and all sub-ranges in the range. For example, the range referred to as "1~10" should be construed as including any and all sub-ranges (including the ending value) between the smallest value 1 and the largest value 10, i.e., all ranges (e.g., from 5.5 to 10) starting with the smallest value 1 and ending with the largest value 10.

Unless otherwise stated, an amount of composition is indicated in "wt %" based on the total weight of final glass composition. A "total amount of iron" in a glass composition disclosed herein is expressed using the term $Fe_2O_3$ according to the standard analysis practice regardless of the phase in which iron really exists. Similarly, an amount of iron in primary phase is reported as FeO even though FeO does not really exist in glass. The term "oxidation/reduction", "redox ratio" or "iron redox ratio" refers to an amount of iron in primary phase (expressed as FeO) divided by a total amount of iron in secondary phase (expressed as $Fe_2O_3$).

Figure 2:
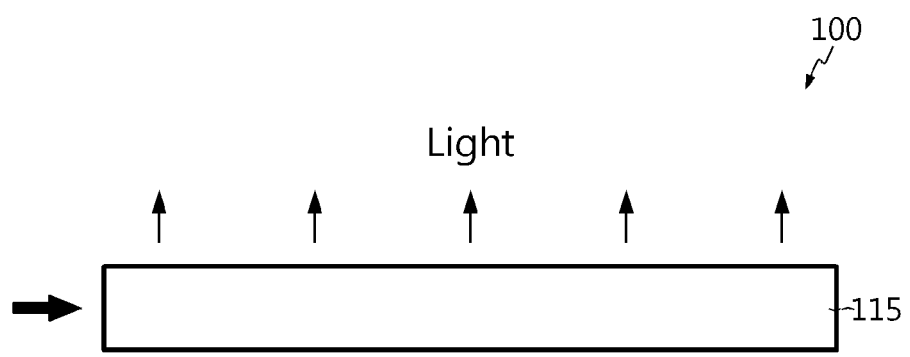
FIG. 2 is a cross-sectional view showing the structure of a light guide plate according to an embodiment of the present disclosure.

FIG. 2 is a cross-sectional view showing the structure of a light guide plate according to an embodiment of the present disclosure.

Referring to FIG. 2, the light guide plate 100 according to this embodiment is made of borosilicate glass 115 with a plate shape containing $SiO_2$ and $B_2O_3$ as main components. Although this embodiment describes a plate, the borosilicate glass 115 may be formed in the shape of a sheet or film for thinner display devices. The light guide plate 100 may have patterns on at least one surface. For example, the borosilicate glass 115 may have scattering patterns (not shown) on the lower surface to direct guided light upwards.

Particularly, in this embodiment, the borosilicate glass 115 of the light guide plate 100 has the following formula: 75~85 wt % of $SiO_2$, 5~15 wt % of $B_2O_3$, 0~5 wt % of $Al_2O_3$, 1~7 wt % of $R_2O$ (where R is at least one of Li, Na and K), and <0.005 wt % of $Fe_2O_3$. Furthermore, the borosilicate glass 115 may further contain 0~0.5 wt % of $SO_3$ or Cl as a fining agent. In this instance, the borosilicate glass 115 has the redox ratio of 0.5 or more. Preferably, the redox ratio is 0.5~0.8. As described above, the borosilicate glass 115 of the present disclosure is low iron glass (<0.005 wt % of $Fe_2O_3$) with a high redox ratio (0.5~0.8).

The borosilicate glass 115 contains 75~85 wt % of $SiO_2$. $SiO_2$ is oxide capable of forming a glass network structure, contributing to the increase in chemical resistance of glass and the possession of a suitable coefficient of thermal expansion to match glass with surrounding materials. However, when $SiO_2$ is present in an excessively large amount, melting or forming of glass becomes difficult and the viscosity increases, making fining and homogenizing of glass difficult. Furthermore, the coefficient of thermal expansion excessively reduces and glass is more prone to losing transparency. On the contrary, when $SiO_2$ is present in an excessively small amount, the chemical resistance reduces and the density increases, and furthermore, the coefficient of thermal expansion increases and the distortion point reduces. Accordingly, the borosilicate glass 115 of the light guide plate 100 according to the present disclosure contains 75~85 wt % of $SiO_2$, and preferably 80~85 wt % of $SiO_2$. Within this range of $SiO_2$ content, the suitable level of chemical resistance, coefficient of thermal expansion and density to fabricate and use as a light guide plate can be obtained.

Furthermore, the borosilicate glass 115 may contain 5~15 wt % of $B_2O_3$. $B_2O_3$ is oxide capable of forming a glass network structure, contributing to enhancing the reactivity of glass to melting, reducing the coefficient of thermal expansion, improving the devitrification resistance, enhancing the chemical resistance such as BHF resistance, and reducing the density (BHF: buffered hydrofluoric acid, a mixture of hydrofluoric acid and ammonium fluoride for etching of SiOx or SiNx). However, when $B_2O_3$ is present in an excessively large amount, the acid resistance of glass reduces, the density increases, and the distortion point reduces, leading to deterioration in heat resistance. Accordingly, the borosilicate glass 115 of the light guide plate 100 according to the present disclosure contains 5~15 wt % of $B_2O_3$, preferably 8~15 wt % of $B_2O_3$, and most preferably 8~14 wt % of $B_2O_3$. This range of $B_2O_3$ content enhances meltability degraded due to a relatively high amount of $SiO_2$, and helps to obtain the suitable level of chemical resistance, heat resistance, the coefficient of thermal expansion to fabricate and use as a light guide plate.

Furthermore, the borosilicate glass 115 may contain 0~5 wt % of $Al_2O_3$. $Al_2O_3$ contributes to improving the viscosity, chemical stability, and thermal shock resistance of glass at high temperature and increasing the distortion point and the Young's modulus. However, when $Al_2O_3$ is present in an excessively large amount, the devitrification resistance, the acid and alkali resistance and the BHF resistance reduces and the viscosity increases. On the contrary, when $Al_2O_3$ is present in an excessively small amount, its addition effect is not fully obtained and the Young's modulus reduces. Accordingly, the borosilicate glass 115 of the light guide plate 100 according to the present disclosure contains 0~5 wt % of $Al_2O_3$, preferably 1~5 wt %, and more preferably 2~3 wt % of $Al_2O_3$. This range of $Al_2O_3$ content helps to obtain desired properties in mechanical rigidity, such as the suitable level of elastic modulus, chemical stability, and thermal shock resistance to use as a light guide plate.

Furthermore, the borosilicate glass 115 may contain 1~7 wt % of $R_2O$ (where R is at least one of Li, Na and K). Particularly, as $R_2O$, $K_2O$ may be >0.1 wt %.

$R_2O$ is ion exchanged in a $KNO_3$ solution during a chemical strengthening process, and contributes to improving meltability, formability or devitrification resistance of glass, lowering the high temperature viscosity of glass, and reducing cracking. However, when $R_2O$ is present in an excessively large amount, the coefficient of thermal expansion of glass excessively increases, making matching with surrounding materials difficult, and the devitrification resistance and thermal shock resistance reduces. On the contrary, when $R_2O$ is present in an excessively small amount, its addition effect is not achieved and the ion exchange performance in a chemical strengthening process degrades. Accordingly, the borosilicate glass 115 of the light guide plate 100 according to the present disclosure contains 1~7 wt % of $R_2O$, preferably 3.5~6 wt % of $R_2O$, and most preferably 3~5 wt % of $R_2O$. Within this range of $R_2O$ content, the suitable level of meltability, formability, thermal shock resistance and ion exchange performance to fabricate and use as a light guide plate can be obtained.

Particularly, $K_2O$ lowers the high temperature viscosity of glass, thereby improving meltability or formability of glass and enhancing devitrification resistance. However, when $K_2O$ is present in an excessively large amount, the coefficient of thermal expansion excessively increases. Accordingly, $K_2O$ is present an amount of greater than 0.1 wt %. Preferably, $K_2O$ is present in an amount of greater than 0.1 wt % and less than or equal to 1 wt %. This range of $K_2O$ content provides appropriate (not too high) refractive index as a light guide plate (not to increase reflectivity).

Particularly, the borosilicate glass 115 of this composition is low iron glass with $Fe_2O_3$<0.005 wt %. Generally, even transparent glass is tinged with light green. This is because glass contains iron (Fe), and a basic raw material of glass silica includes a small amount of irons. To obtain more transparent glass than general glass, it is necessary to remove iron included in the raw materials, and iron-free glass has little or no color and is found transparent. For $Fe_2O_3 < 0.005$ wt %, an impurity removal process may be needed. Removing $Fe_2O_3$ is the most ideal, but requires high costs, and $Fe_2O_3$ is preferably present in an amount of less than 0.005 wt %, and more preferably less than 0.003 wt % if possible. Because $Fe_2O_3$ is present in a small amount, glass does not discolor, and the light guide plate 100 including the borosilicate glass 115 does not need to use an optical film for color correction.

Particularly, to reduce the color difference of the light guide plate 100, the present disclosure controls the redox ratio of the borosilicate glass 115 in the range of 0.5 or more, and preferably, 0.5~0.8.

As understood by those skilled in the art, the redox ratio is defined, in the presence of iron in glass, as the total amount of iron in FeO/glass, and the redox ratio increases with the reduction of $Fe^{3+}$ to $Fe^{2+}$.

As mentioned previously, the light guide plate is designed to diffuse light from a side light source uniformly in an upward direction with minimum loss to create a surface light source, and in this instance, a difference between color of a region close to the light source and color of a region far away from the light source is caused by a difference between light-absorbing materials in glass, and is referred to as a color difference.

When the redox ratio is 0.5 or more in low iron composition, x- and y-direction color differences are solved when using as a light guide plate. However, when the redox ratio is more than 0.8, iron ions form a compound FeS with impurities in glass such as sulfur S in a strong reducing atmosphere, showing completely different optical properties from the optical properties of $Fe^{2+}$ and $Fe^{3+}$ ions. The FeS compound causes gold-amber coloration in glass and reduces the transmittance performance of glass. Accordingly, preferably, the present disclosure controls the redox ratio in the range of 0.5~0.8.

The control of the redox ratio may be achieved by adding sulfur or carbon as a reducing agent, or adjusting the melting and fining conditions and/or the annealing conditions of raw materials.

For example, the redox ratio of glass melt may be controlled by adding 0.1 wt % or less of carbon to glass raw materials. Alternatively, the redox ratio of glass melt may be controlled by adding 0.001~0.05 wt % of sulfur to glass raw materials.

Meanwhile, greater amounts of $Fe^{2+}$ are produced at high temperature at which glass is molten, and thus, in order to maintain the redox ratio determined at high temperature, annealing following forming in the production of glass is performed at a faster rate to prevent the redox ratio at high temperature from changing. The annealing rate is set to 10° C./min~40° C./min. Appropriate annealing of glass is set based on the width, thickness and pull rate of glass to produce. When the annealing rate is slower than 10° C./min, it is difficult to maintain the redox ratio at high temperature. When the annealing rate is faster than 40° C./min, stress may occur in glass.

The borosilicate glass 115 does not substantially contain transition metal compound which adjusts a color difference. The transition metal compound may be NiO, CuO, $Cr_2O_3$, $V_2O_5$ or MnO. "not substantially containing" means that intentional addition is banned except impurities included in raw materials themselves.

As described above, when the light guide plate 100 made of the borosilicate glass 115 of this composition is used, even though high temperature environment is created by the light source during use, it is possible to make good use of advantages of glass that does not release volatile organic compounds and is less susceptible to deformation induced by outdoor moisture or heat. The borosilicate glass 115 of this composition proposed by the present disclosure has excellent mechanical strength and can be selected as a material of the light guide plate 100.

Particularly, the borosilicate glass 115 has the controlled low iron content in glass to maintain luminance of the light guide plate 100 and the controlled redox ratio to reduce a color difference. When the light guide plate 100 comprising the borosilicate glass 115 is used in a LCD module, luminance and color difference performance more than the level of conventional polymer is satisfied.

The borosilicate glass 115 needs to be free of defects (bubbles, striae, inclusions, pits, and flaws) inside and on the surface. To this end, a method for fabricating borosilicate glass includes melting and fining glass with an addition of a fining agent. The borosilicate glass 115 may further contain 0~0.5 wt % of $SO_3$ or Cl as a fining agent. This amount is not an input amount in glass raw materials, and it is a remaining amount in glass melt, and is an amount present in glass after fabrication. The fining agent and its amount improves the fining effect in melting glass raw materials, and prevents reboil bubbles that may be generated during stirring after fining. Furthermore, the inclusion of the fining agent may change the redox ratio, and thus, the type and amount of fining agent is set on the basis that the redox ratio of the borosilicate glass 115 is 0.5 or more, and preferably 0.5~0.8.

The light guide plate 100 having the thickness of 2 mm or less is preferable in terms of thinner LCDs. The composition of the borosilicate glass 115 included in the light guide plate 100 may be adjusted within the range such that visible light (380 nm~780 nm) transmittance is higher than or equal to that of a polymer light guide plate or is 92% or more, the refractive index is 1.49 or less, and the coefficient of thermal expansion is $10 \times 10^{-6}$/K or less, on the basis of 2 mm thickness of the borosilicate glass 115. Preferably, the refractive index is 1.475 or less, and the coefficient of thermal expansion is $5 \times 10^{-6}$/K or less. This low coefficient of thermal expansion does not greatly change the dimension of the light guide plate 100 comprising the borosilicate glass 115 as the temperature changes. The light guide plate 100 is less susceptible to deformation under the exposure to high temperature, and thus, processing of the light guide plate 100 can be accomplished in high temperature range, thereby expanding the range of applications.

The density of the borosilicate glass 115 may be 2.0 g/cm³ or more, and preferably 2.2 g/cm³ or more. The density of the borosilicate glass 115 may be 2.5 g/cm³ or less. According to this embodiment, low density of glass achieves light weight of glass products. Particularly, in the situation in which the area of glass gradually increases with the increasing scale of devices using glass, when the density of glass is lower, warpage caused by the self-load of glass reduces, and the weight of devices using glass reduces.

The glass transition temperature (Tg) of the borosilicate glass 115 may be 500° C. or more, and preferably 520° C. or more. This glass transition temperature is very high compared to normal polymer, implying that the heat resistance is superior.

For convenience of production, the working temperature ($T_4$, temperature at the viscosity of $10^4$ dPas) of the borosilicate glass 115 is preferably 1,270° C. or less, and more preferably 1,250° C. or less. According to this embodiment, low $T_4$ related to the processing temperature of glass facilitates the glass processing, and can save energy and time required for glass processing.

As the borosilicate glass 115 is used to impart superior mechanical rigidity over the conventional polymer light guide plate, the elastic modulus (Young's modulus) of the borosilicate glass 115 may be 60 GPa or more, and preferably 65 GPa or more. According to this embodiment, because the elastic modulus is high, the desired mechanical strength can be obtained even though the thickness is small.

Poisson's ratio refers to a ratio of lateral strain $\varepsilon_d$ to longitudinal strain $\varepsilon_1$ under the action of longitudinal stress on a material, and in plain language, a ratio of contraction in the lateral direction to expansion in the longitudinal direction. In simple tensile stress, a perfectly incompressible material deformed elastically at small strain would have a Poisson's ratio of 0.5, a Poisson's ratio of steels is about 0.3, a Poisson's ratio of concrete is 0.1-0.2, and cork has a value close to 0. The Poisson's ratio (a ratio between lateral and longitudinal deformation) of the borosilicate glass 115 of the present disclosure may be 0.23 or less, and preferably 0.2 or less.

Central tension and compressive stress of glass is related to the Poisson's ratio, the coefficient of thermal expansion, and the elastic modulus. This range of Poisson's ratio and the aforementioned range of coefficient of thermal expansion and elastic modulus are the range of central tension and compressive stress of glass suitable for the use as a light guide plate.

The flexural strength of the borosilicate glass 115 as an un-strengthened mother glass may be at least 20 MPa or more, and preferably 25 MPa or more. According to this embodiment, high flexural strength provides resistance to warpage, achieving thickness reduction.

Within the range of Poisson's ratio, coefficient of thermal expansion, elastic modulus and flexural strength, the borosilicate glass 115 maintains the mechanical strength as the light guide plate 100 even when it is 2 mm thick or less. Preferably, if the borosilicate glass 115 is an un-strengthened mother glass, the thickness of the borosilicate glass 115 may be adjusted to the range of 1.6 mm or more and 2 mm or less, which is very advantageous in terms of thinner LCDs.

Furthermore, strengthened glass obtained by chemically strengthening the borosilicate glass of this composition can be used for the light guide plate 100. The strengthened glass may have a compressive stress layer (DOL) with the thickness greater than 10 um. That is, the borosilicate glass according to the present disclosure may have a compressive stress layer with the thickness greater than 10 um when chemically strengthened. More preferably, the thickness of the compressive stress layer may be greater than 20 um. More preferably, the thickness of the compressive stress layer may be greater than 30 um. According to this embodiment, as the compressive stress layer is thick, the mechanical strength of the strengthened glass may be improved. Particularly, when the compressive stress layer is thick, glass may not be broken even though damage occurs to some depths.

The chemically strengthened borosilicate glass 115 can maintain the mechanical strength as the light guide plate 100 even though the thickness is 1.6 mm or less. The thickness of the chemically strengthened borosilicate glass 115 may change depending on the thickness and compressive strength of the compressive stress layer, but may be adjusted to the range of 1.4 mm or more and 1.6 mm or less, which is more advantageous in terms of thinner LCDs.

Particularly, the light guide plate 100 using the borosilicate glass 115 of the above composition is low iron glass, with no need to use an optical film for color correction. Conventional glass light guide plate has been proposed, but conventional glass composition has a color coordinate difference and a color difference between a light-input portion on which light from the light source is incident and an anti-light-input portion on the opposite side to light-input portion, resulting low image quality of LCDs. However, according to the present disclosure, this problem is avoided, and there is no need to use an optical film for color correction.

The light guide plate 100 is a component of a backlight unit of a LCD to diffuse light entering from the side and radiate in all directions. Accordingly, the borosilicate glass 115 may have optical patterns (not shown) on the lower surface to diffuse and radiate incident light in all directions. The optical patterns may be formed by texturing or bead particle film coating. Conventionally, optical patterns were formed by etching PMMA or coating PMMA with a polymer film, but in the present disclosure, the light guide plate 100 is made of the borosilicate glass 115, so optical patterns may be formed through laser etching after fabrication of the borosilicate glass 115 or by printing polymer patterns on the glass surface.

Figure 3:
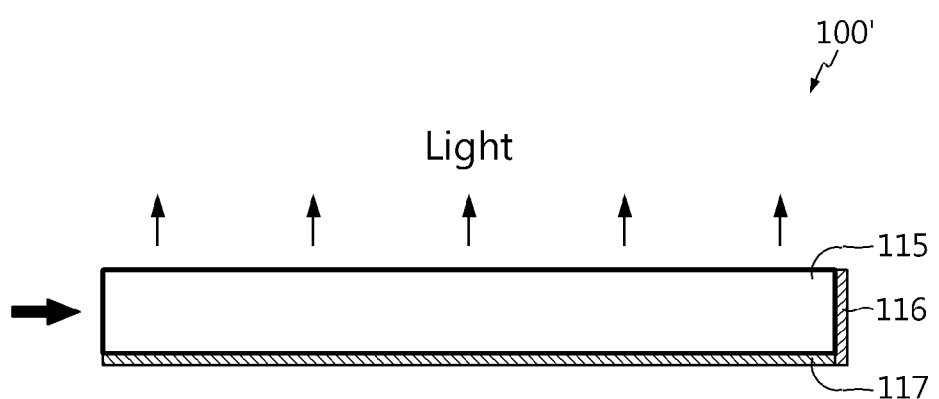
FIG. 3 is a cross-sectional view showing the structure of a light guide plate according to another embodiment of the present disclosure.

FIG. 3 is a cross-sectional view showing the structure of a light guide plate according to another embodiment of the present disclosure.

Referring to FIG. 3, the light guide plate 100' comprises the borosilicate glass 115 in the same way as the previous embodiment, and its detailed description is not repeated.

Meanwhile, the light guide plate 100' may further include a reflection film on other surfaces except a surface on which light is incident (in this embodiment, a left side surface) to minimize a light loss on the side surface. For example, a side reflection film 116 and a lower reflection film 117 may be formed by coating a combination of $TiO_2$ and a metal film on the side surface and the lower surface of the borosilicate glass 115. In this instance, the metal film may be formed by coating metal, for example, Ag, Al or Cr.

Meanwhile, although not shown, in another example, the surface of the borosilicate glass 115 on which light is incident may have an inwardly concave structure. If the borosilicate glass 115 has a structure in which the surface area of the light entering surface increases, an advantage is that light from the light source is incident with an increased surface area and luminance increases.

To form a concave structure, rolling using a suitable structuring device such as pressing or stamping using an appropriate structuring machine may be used, and the borosilicate glass 115 is heated up to the temperature at which the viscosity fits the purpose, and the temperature is between the softening point of glass and the working point. This type of structure may be obtained by another fabrication method, and for example, stamping, etching, machining, chemical etching or laser ablation. The necessary structure may be also obtained directly from molten glass of the glass fabrication process by high temperature molding or forming processes.

The light guide plate 100, 100' may be included in a backlight unit of a LCD.

Figure 4:
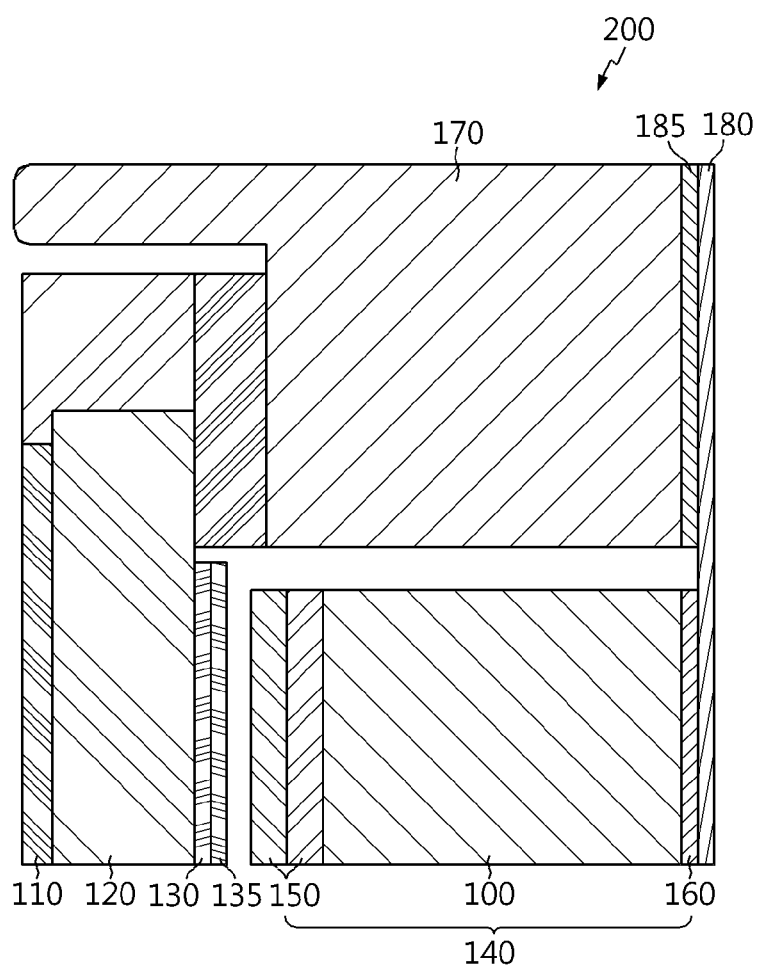
FIG. 4 is a cross-sectional view of a LCD including the light guide plate of FIG. 2.

FIG. 4 is a cross-sectional view of a LCD including the light guide plate of FIG. 2.

Referring to FIG. 4, the LCD 200 includes a liquid crystal panel 120 equipped with an upper polarizing film 110 and a lower polarizing film 130. The liquid crystal panel 120 may include a thin film transistor substrate and a color filter substrate bonded to each other with a liquid crystal layer interposed between, in the same way as conventional LCDs. Next to the lower polarizing film 130, a dual brightness enhancement film (DBEF) 135 may be further provided.

A backlight unit 140 is provided at a predetermined distance from the liquid crystal panel 120, and the backlight unit 140 may include an optical sheet 150, the light guide plate 100 according to the present disclosure, a reflection sheet 160, and a light source (not shown). The liquid crystal panel 120 and the backlight unit 140 are maintained by a middle cabinet 170 that covers them on the side and a back cover 180 that supports the bottom. An adhesive film 185 may be further included to prevent moisture penetration through a space between the middle cabinet 170 and the back cover 180.

The light source may include at least one LED chip that emits light, and a package that receives the LED chip, in the same way as conventional LCDs, and the light source is disposed on a circuit board (see 23 in FIG. 1). The light source may be disposed at the corner or the light-input side of the light guide plate 100. The light source may be formed at one side, two sides, or four sides of the light guide plate 100, and may be formed on at least one of the corners of the light guide plate 100, taking into account the size and luminance uniformity of the liquid crystal panel 120.

The light guide plate 100 receives light from the light source through the light-input side surface and emits it through a light emitting surface. The light guide plate 100 uniformly supplies light from the light source to the liquid crystal panel 120.

The optical sheet 150 is disposed on the light guide plate 100 to diffuse and focus light transmitted from the light guide plate 100. The optical sheet 150 may include a diffusion sheet, a prism sheet, and a protective sheet. The diffusion sheet diffuses light entering from the light guide plate 100 to prevent the partial concentration of light. The prism sheet may have a regular arrangement of triangular prisms on one surface, and may be disposed on the diffusion sheet to focus the light diffused from the diffusion sheet in the direction perpendicular to the liquid crystal panel 120. The protective sheet may be formed on the prism sheet to protect the surface of the prism sheet and diffuse light, achieving uniform distribution of light.

The reflection sheet 160 is disposed between the light guide plate 100 and the back cover 180 to reflect light emitting below the light guide plate 100 toward the liquid crystal panel 120, improving the efficiency of light.

The reflection sheet 160 may be made of, for example, polyethylene terephthalate (PET) to possess reflectance, and may be coated with, for example, a diffusion layer containing titanium dioxide on one surface. Meanwhile, the reflection sheet 160 may be made of, for example, a material including metal such as Ag.

The light guide plate 100' described with reference to FIG. 3 has the lower reflection film 117 itself, thereby eliminating the reflection sheet 160 when assembling a LCD.

As described with reference to FIG. 1, a conventional LCD 1 uses the guide panel 40 and the cover bottom 30 to fix the liquid crystal panel 10. When a LCD module itself comprises an exterior of a TV without adding components of TV manufacturers to produce thinner LCDs, rigidity is maintained by using an aluminum composite material (ACM) or GCM cover bottom in 2.0~2.5 mm thickness in place of the back cover 180 and the middle cabinet 170 of aluminum covering the edges like this embodiment.

Particularly, because of its superior mechanical rigidity over the conventional light guide plate of PMMA, the use of the light guide plate 100 according to the present disclosure leads to elimination of the conventional cover bottom, and further, elimination of the back cover 180 from the structure of FIG. 3.

The substitute material for the cover bottom such as ACM and GCM keeps opaque properties, disallowing light from the light source to permeate therethrough. Because the light guide plate 100 according to the present disclosure includes the borosilicate glass 115, it is transparent. Furthermore, because the borosilicate glass 115 has high-temperature stability and the mechanical properties that can replace the conventional polymer light guide plate and metal frame, a thin transparent membrane of a film, polymer and plastic can be applied instead of eliminating the back cover 180 of ACM or GCM.

Furthermore, the thickness of the light guide plate 100 made of the borosilicate glass 115 may be 2 mm or less, and its advantage is that the bezel becomes thinner. Accordingly, the total thickness of a LCD module reduces, which is very advantageous for thickness reduction. Seeing that conventional PMMA is about 3.5 mm thick, the thickness of the light guide plate can be reduced by approximately 40%. Furthermore, even though the thickness of the bezel reduces, because the coefficient of thermal expansion of the light guide plate 100 is as small as $\frac{1}{10}$ of conventional PMMA, deformation does not occur.

As described above, the light guide plate 100 according to the present disclosure may be integrated with the light source for the LCD 200 and other optical materials, making up the backlight unit 140, but a separate structure for maintaining LCD module structure rigidity is not required. Of course, when necessary, a thin transparent membrane of a film, polymer and plastic, and a metal may be additionally applied.

The display device according to the present disclosure is preferably a LCD as described above, and includes the light guide plate according to the present disclosure.

Figure 5:
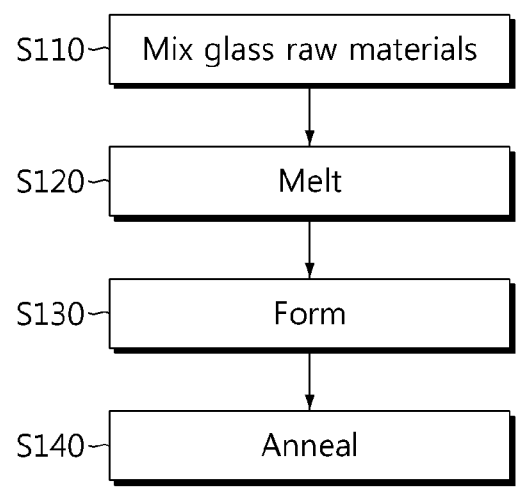
FIG. 5 is a flowchart illustrating a method for fabricating a borosilicate glass and a light guide plate comprising the same according to an embodiment of the present disclosure.

FIG. 5 is a flowchart illustrating a method for fabricating a borosilicate glass and a light guide plate comprising the same according to an embodiment of the present disclosure.

Referring to FIG. 5, each raw material of glass is mixed with a target formula (S110). In this instance, in S110, raw materials are mixed based on 75~85 wt % of $SiO_2$, 5~15 wt % of $B_2O_3$, 0~5 wt % of $Al_2O_3$, 1~7 wt % of $R_2O$ (where R is at least one of Li, Na and K), and less than 0.005 wt % of $Fe_2O_3$. In this instance, $K_2O$>0.1 wt %, and $SO_3$ or Cl as a fining agent may be further included as previously described. The glass raw materials may be obtained from known starting materials including alkali oxide such as Na, K and Li.

Particularly, for the redox ratio of 0.5 or more, preferably 0.5~0.8, the glass raw materials may further contain 0.1 wt % or less of carbon or 0.001~0.05 wt % or sulfur.

Subsequently, a combination of glass raw materials are heated to predetermined temperature, for example, 1500~1600° C., to melt the glass raw materials (S120), and a fining process is performed and forming of the molten glass is performed (S130).

In the melting process (S120), the glass raw materials are heated in a melting furnace (not shown) to make molten glass. Subsequently, in the fining process, bubbles in the molten glass are removed using the fining agent in a fining tank (not shown). In the fining process, as the molten glass in the fining tank increase in temperature, bubbles including $O_2$, $CO_2$ or $SO_2$ in molten glass grow by absorbing $O_2$ produced by reduction reaction of the fining agent, and float on the surface of the molten glass and are discharged (debubbling process). Furthermore, in the fining process, as the temperature of molten glass reduces after debubbling, $O_2$ in bubbles remaining in the molten glass is absorbed into the molten glass by the action of oxidation of the reaction product obtained by reduction reaction of the fining agent, and bubbles disappear (absorption process). The oxidation reaction and reduction reaction by the fining agent is made by controlling the temperature of the molten glass.

Subsequent to the fining process, a stirring process may be performed. In the stirring process, to maintain chemical and thermal uniformity of glass, the molten glass passes through a stirring tank (not shown) that runs vertically. The molten glass is moved to the vertical downward direction bottom while it is being stirred by a stirrer installed in the stirring tank, and is guided to a subsequent process. Accordingly, the non-uniformity problem of glass such as striae can be solved.

Subsequently, a forming process is performed (S130). In this instance, S130 is performed by a float method using a float bath.

When forming of glass is performed at S130, the formed glass is transferred to a cooling furnace and goes through annealing (S140). Preferably, the annealing rate is set to 10° C./min~40° C./min to accomplish annealing while maintaining a high redox ratio in the melted glass raw materials. Appropriate annealing of glass is set based on the width, thickness, and pull rate of glass to produce.

Subsequently, the annealed glass is cut to a desired size, and processing such as polishing is further performed, and the borosilicate glass 115 and the light guide plate 100, 100' comprising the same may be fabricated through a series of processes.

Figure 6:
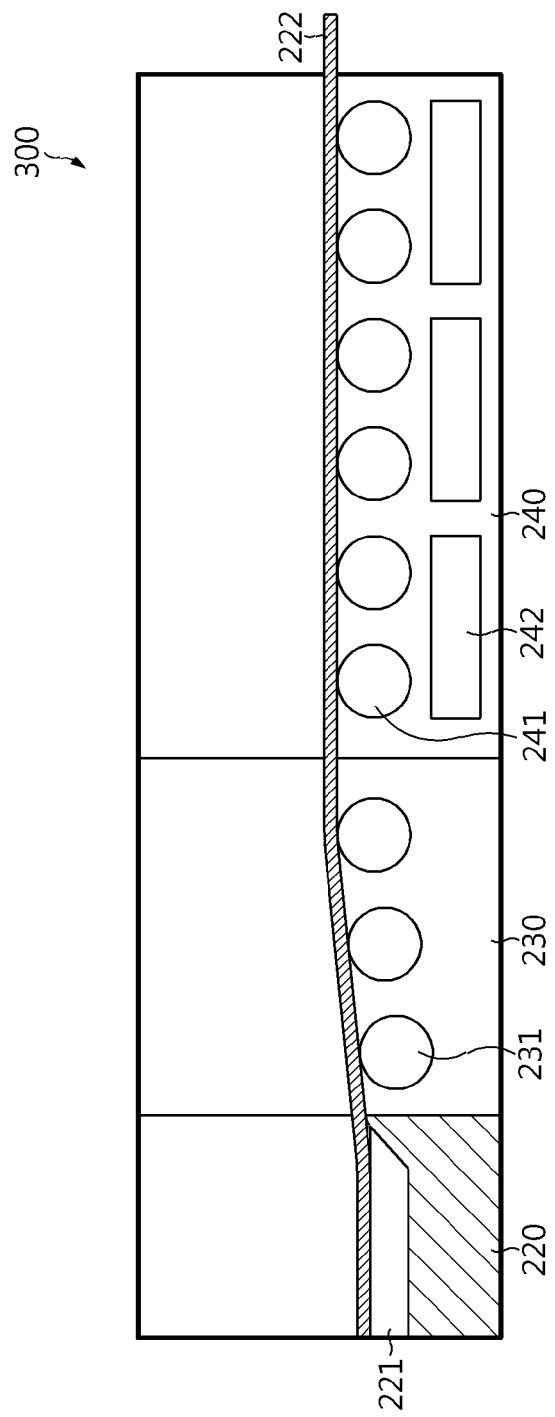
FIG. 6 is a cross-sectional view of a method for fabricating a glass plate using a float method that can perform the methods for fabricating borosilicate glass and a light guide plate according to the present disclosure.

FIG. 6 is a cross-sectional view of an apparatus for fabricating a glass plate that can perform S130 and S140.

Referring to FIG. 6, the apparatus 300 for fabricating a glass plate includes a float bath 220 in which molten tin 221 is received and forming of molten glass in the shape of a flat plate is performed, a cooling furnace 240 to anneal the molten glass, and a dross box 230 to pull the molten glass from the float bath 220 and transmit the molten glass to the cooling furnace 240.

The molten glass is formed into a glass plate 222 in the shape of a ribbon on the surface of the molten tin 221 while it is moving from the upstream side of the float bath 220 toward the downstream side, and is pulled away from the molten tin 221 by rollers 231 installed in the dross box 230 from a take-off point set on the downstream side of the float bath 220, and sent to the cooling furnace 240 for a next process through the dross box 230.

The cooling furnace 240 is composed of multiple sections, and multiple rollers 241 are used in one section as shown, and a heater 242 is installed at a space below the rollers 241. In the cooling furnace 240, the glass plate 222 in the shape of a ribbon is cooled down to the temperature that is lower than or equal to the annealing point of glass, while controlling the temperature to prevent twist and warpage.

The apparatus 300 for fabricating a glass plate can fabricate the large-scale flat glass plate 222. The annealed glass plate 222 is taken from the apparatus 300 for fabricating a glass plate and cut to a desired size, and processing such as polishing is further performed, yielding the borosilicate glass 115 and the light guide plate 100, 100' comprising the borosilicate glass. Multiple excellent borosilicate glasses 115 can be obtained from the large-scale flat glass plate 222, achieving high productivity in fabricating the light guide plate 100, 100'.

As described above, the borosilicate glass fabricated by the fabricating method according to an embodiment of the present disclosure and the light guide plate comprising the same may have the thickness of 1.4 mm or more and 2 mm or less, and visible light (380 nm~780 nm) transmittance that is higher than or equal to that of polymer light guide plate or is 92% or more on the basis of 2 mm thickness, and they may be made of or comprise borosilicate glass having the coefficient of thermal expansion of $10\times10^{-6}$/K or less, preferably $5\times10^{-6}$/K or less, such as the refractive index is 1.49, preferably 1.475 or less.

Furthermore, the methods for fabricating borosilicate glass and a light guide plate according to the present disclosure may include chemical strengthening of the borosilicate glass fabricated by the aforesaid method.

That is, the methods for fabricating borosilicate glass and a light guide plate according to the present disclosure may include chemical strengthening of the borosilicate glass fabricated through S110 to S140 to fabricate strengthened glass, and the chemical strengthening may be performed after S140. In this instance, the chemical strengthening step may be performed by dipping the borosilicate glass in molten salts such as $KNO_3$ for a predetermined period of time. The mechanical strength of the borosilicate glass may be improved through ion exchange during this process. To fabricate the chemically strengthened glass, the borosilicate glass of the aforesaid composition has appropriate composition to ensure good ion exchange performance. However, the present disclosure is not necessarily limited to this chemical strengthening technique.

With the increasing scale of display devices, light guide plates used therein need to increase in area. In this case, warpage of glass may increase due to the self-load of glass, and to prevent this, glass needs to be fabricated with reduced weight. The borosilicate glass according to the present disclosure satisfies these characteristics by achieving light weight.

The borosilicate glass according to the present disclosure achieves good mechanical strength and light weight. It ensures appropriate processability and formability. Using the borosilicate glass, a light guide plate can be fabricated.

Furthermore, the method for fabricating a light guide plate according to the present disclosure may further include forming a pattern structure for scattering of incident light on the glass fabricated by the method for fabricating glass.

The method for forming patterns includes printing and laser etching.

The printing involves forming polymer patterns for scattering on glass by printing. The laser etching involves forming patterns for scattering by etching the glass surface using a laser.

Particularly, in the present disclosure, because a light guide plate comprises borosilicate glass, forming of patterns can be directly performed by heating in the fabrication of borosilicate glass.

The patterns may be formed in the shape of protrusions including prism, lenticular, pyramid and embossing, or may be formed with a concavo-convex structure having ridges and valleys. The upper surface of the patterns with a prism or pyramid shape may be round or flat. The embossing and lenticular may be formed in a hemispheric shape. Furthermore, the patterns preferably have a shape that is level with the light-input surface of the light guide plate.

Hereinafter, comparative examples and examples are described in detail to explain the present disclosure more specifically. The examples according to the present disclosure, however, may be modified in many other forms, and the scope of the present disclosure should not be construed as being limited to the following examples. The examples of the present disclosure are provided to explain the present disclosure more clearly and fully to those having ordinary knowledge in the art.

Table 1 shows glass composition of comparative example and example samples.

TABLE 1

| | $SiO_2$ wt % | $Al_2O_3$ wt % | $B_2O_3$ wt % | $Na_2O$ wt % | $K_2O$ wt % | Cl wt % | $Fe_2O_3$ wt % | Redox ratio |
|---|---|---|---|---|---|---|---|---|
| Sample 1 (Comparative example) | 80 | 2 | 13 | 3 | 1 | 0.02 | 0.0043 | 0.2 |
| Sample 2 (Comparative example) | 80 | 2 | 13 | 3 | 1 | 0.02 | 0.0043 | 0.4 |
| Sample 3 (Example) | 80 | 2 | 13 | 3 | 1 | 0.02 | 0.0043 | 0.6 |
| Sample 4 (Comparative example) | 80 | 2 | 13 | 3 | 1 | 0.02 | 0.015 | 0.55 |

As can be seen from Table 1, samples 1 to 3 have glass composition corresponding to the present disclosure, and sample 4 has the Fe content outside the range of the present disclosure. Samples 1 to 3 have the Fe content fixed to 0.0043 wt % (43 ppm), and the redox ratio increasing in the order of about 0.2 (20%), about 0.4 (40%), and about 0.6 (60%). Sample 4 has the redox ratio of about 0.55 within the redox ratio range of the present disclosure but the Fe content of 0.015 wt % (150 ppm) having a difference from the present disclosure. As described above, samples 1, 2 and 4 are comparative example, and sample 4 is example.

Each of raw materials was mixed with the formula as shown in Table 1, and was melted by heating at the temperature of 1650° C. for 3 hours using a platinum crucible. During melting, a platinum stirrer was inserted, and glass was homogenized by stirring for 1 hour. Subsequently, the molten glass was annealed at 550° C., yielding sample glass. The resultant glass was processed to the thickness of 10 mm, 20 mm, and 40 mm.

For the fabricated glass, absorption, transmittance and color difference were tested.

Figure 7:
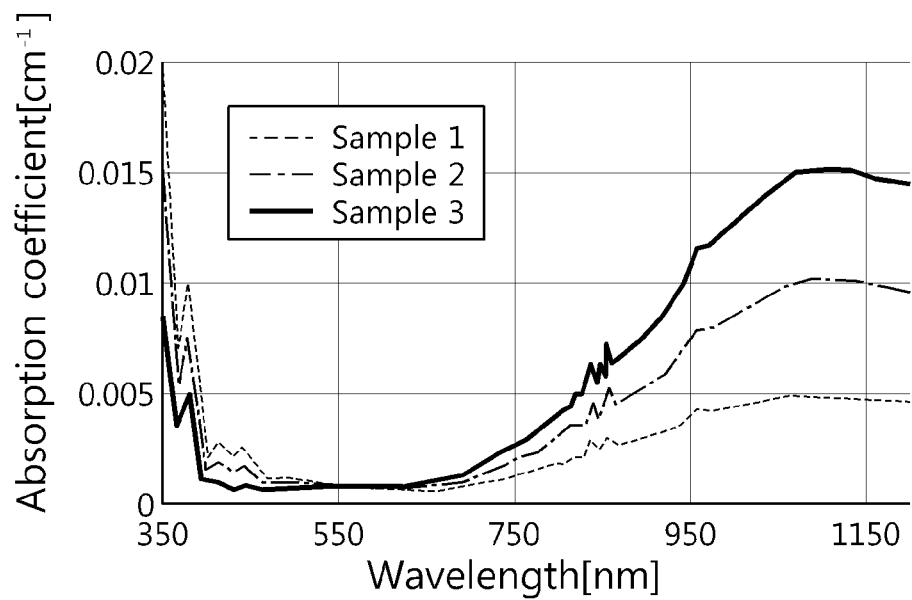
FIG. 7 is an absorption graph of borosilicate glass according to comparative example and example of the present disclosure.

First, FIG. 7 is an absorption graph of borosilicate glass according to comparative example and example of the present disclosure.

As can be seen from FIG. 7, it was identified that glass of the above composition, in particular, sample 3 could be used for a light guide plate that efficiently transmits light from a backlight unit, i.e., solves the luminance reduction problem because of small visible light (380 nm~780 nm) absorption. The redox ratio increases as it goes from sample 1 to sample 3, and when the redox ratio is about 0.6 as in sample 3, absorption in the long wavelength range is more than samples 1 and 2.

Figure 8:
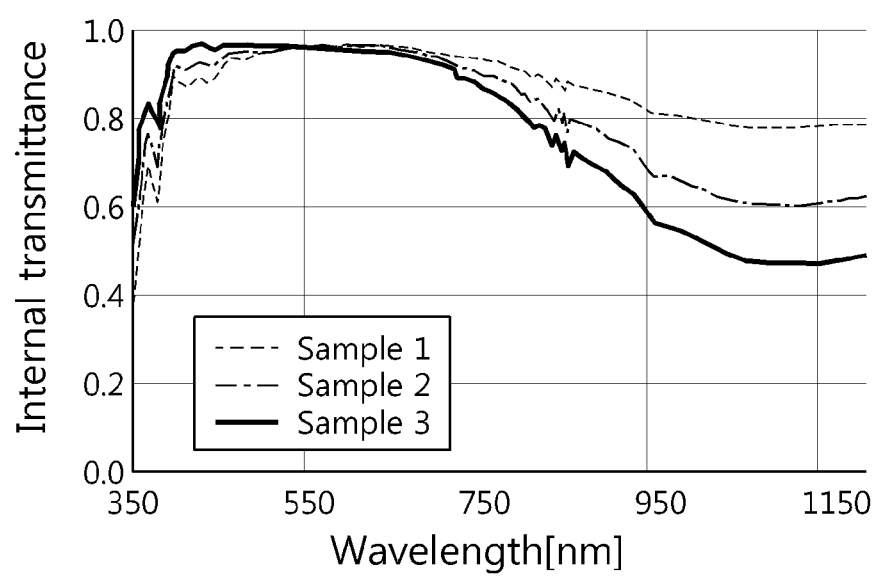
FIG. 8 is a transmittance graph of borosilicate glass according to comparative example and example of the present disclosure.

FIG. 8 is a transmittance graph of borosilicate glass according to comparative example and example of the present disclosure.

As can be seen from FIG. 8, it was found that glass of the above composition, in particular, sample 3, had visible light (380 nm~780 nm) transmittance of 93% or more. Specifically, the average transmittance of samples 1 and 2 was found to be 93.1%, and the average transmittance of sample 3 was found to be 93%. Outside the visible light range, for example, in the long wavelength range, as expected from the converse of the previous absorption results, sample 3 has less transmittance than samples 1 and 2. As described above, FIG. 8 shows good transmittance of borosilicate glass according to the present disclosure in 380 nm~780 nm. Accordingly, this glass can perform the function as a light guide plate.

Figure 9:
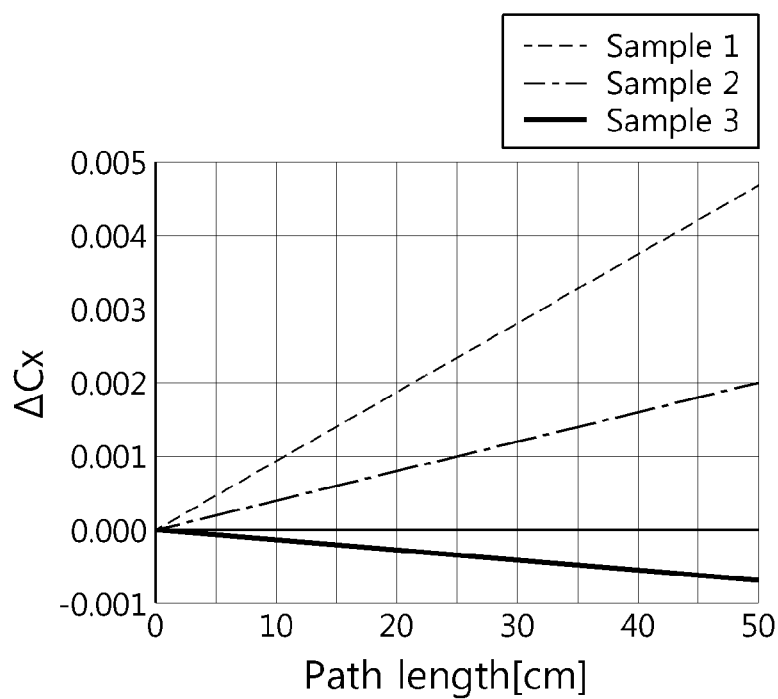
FIG. 9 is an x-direction color difference (ΔCx) graph of borosilicate glass according to comparative example and example of the present disclosure.
Figure 10:
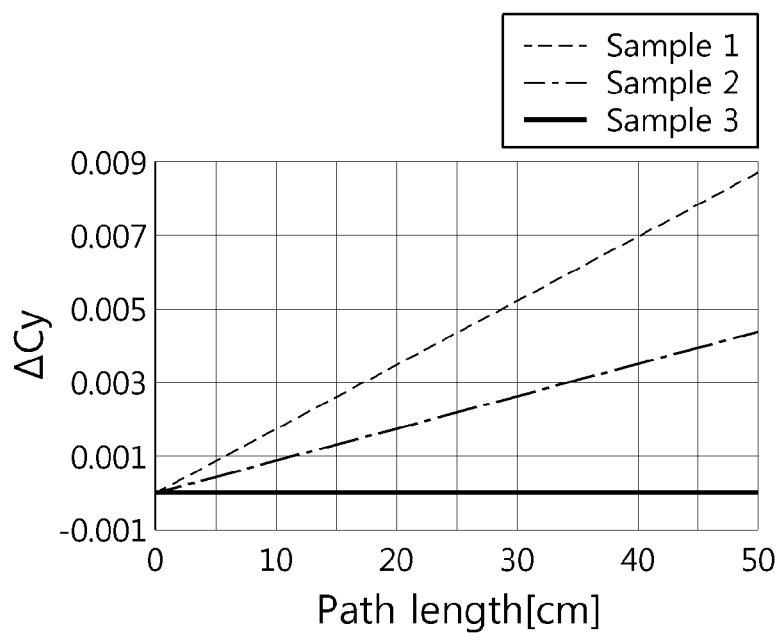
FIG. 10 is a y-direction color difference (ΔCy) graph of borosilicate glass according to comparative example and example of the present disclosure.

FIG. 9 is an x-direction color difference (ΔCx) graph of borosilicate glass according to comparative example and example of the present disclosure, and FIG. 10 is a y-direction color difference (ΔCy) graph of borosilicate glass according to comparative example and example of the present disclosure. With an increase in the x direction on the color coordinates, the color changes to green, and with an increase in the y direction, the color changes to red. Accordingly, with the simultaneous increase in x and y, the color changes to yellow.

As can be seen from comparison of samples 1 to 3, as the redox ratio increases, a color difference caused by glass reduces. In the case of sample 2 or 3, at a site 500 mm away from the light-input portion (i.e., path length 500 mm), a color difference is +0.015~−0.015. Particularly, it can be seen that it has a color difference of − when the redox ratio is 0.6 as in sample 3.

Figure 11:
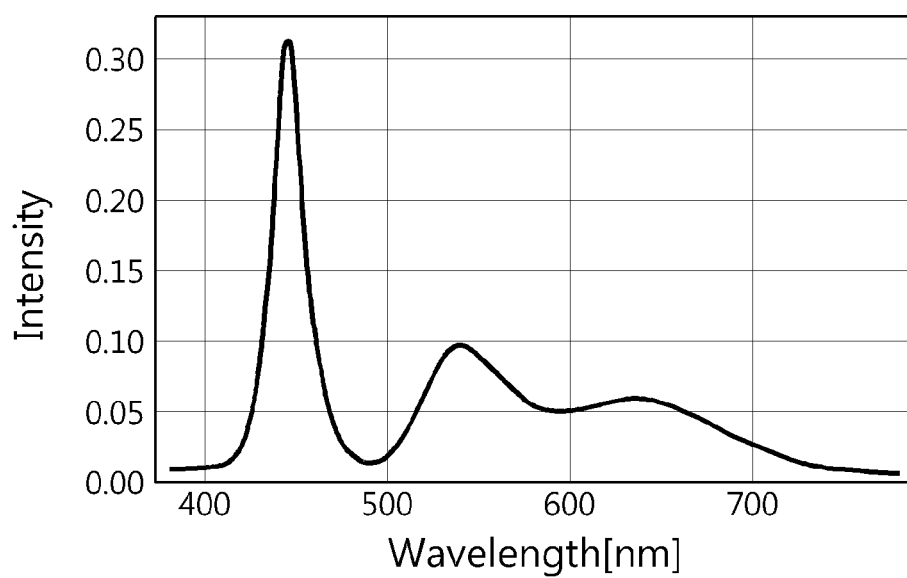
FIG. 11 is an intensity graph vs wavelength of a general white LED of a backlight unit.
Figure 12:
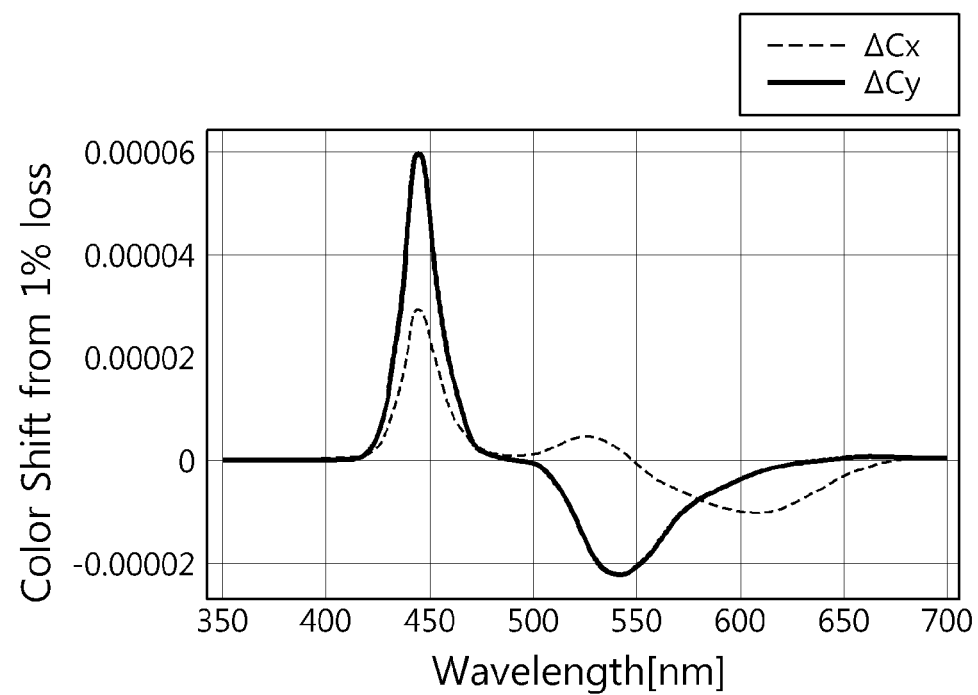
FIG. 12 is a graph showing sensitivity to color difference vs wavelength by transmittance properties of glass when comparative example glass is used in a LCD module with a white LED as a backlight unit.

FIG. 11 is an intensity graph vs wavelength of a general white LED of a backlight unit, and FIG. 12 is a graph showing sensitivity to color difference vs wavelength by transmittance properties of glass when glass of sample 2 is used in a LCD module with a white LED as a backlight unit.

Referring to FIG. 12, ΔCx exhibits the "−" effect in 550 nm or less and the "+" effect in 550 nm or more, and ΔCy exhibit the "−" effect in 480 nm or less and the "+" effect in 480 nm or more. The color difference tends toward "−" with an addition of $Fe^{3+}$, and "+" with an addition of $Fe^{2+}$. In wavelengths of 410 nm or less and 690 nm or more, transmittance is not influenced by a color difference.

In the case of sample 4, the redox ratio of glass is similar to sample 3 but the iron content of glass is greater about four times. As a result of measuring a color difference of sample 4 glass, ΔCx is 0.014, and ΔCy is 0.050, showing a larger color difference than low iron glass of sample 3 according to example.

As described above, a high redox ratio of sample 4 of 150 ppm that is higher iron content than the present disclosure allows for less absorption of long wavelength and more absorption of short wavelength in the calculated transmission spectrum, as a result, making an error in a direction in which a color difference increases.

Meanwhile, when a glass light guide plate is really used in a LCD module, a color difference occurs not only due to glass but also due to an optical structure and a LCD cell, and in summing up, ΔCx is about +0.010 and ΔCy is about +0.020. That is, it is preferred that a color difference caused by glass has (−) direction if possible.

As can be seen from FIGS. 9 and 10 above, sample 3 glass according to example of the present disclosure has a "−" color difference, and thus this glass has an excellent color difference reduction effect when it is really used in a LCD module.

As described above, glass according to the present disclosure has a better color difference reduction effect than glass of comparative example composition due to the redox ratio control, and is thus more suitable for a light guide plate.

Table 2 shows glass composition of another example sample.

TABLE 2

| | SiO₂ wt % | Al₂O₃ wt % | B₂O₃ wt % | Na₂O wt % | K₂O wt % | Fe₂O₃ wt % | Cl wt % | SO₃ wt % | C wt % | Redox ratio |
|---|---|---|---|---|---|---|---|---|---|---|
| Sample 5 (Example) | 85 | 1 | 10 | 3 | 1 | 0.0038 | 0.02 | 0.005 | 0.05 | 0.51 |
| Sample 6 (Example) | 81 | 0 | 15 | 3 | 1 | 0.0040 | 0.02 | 0.005 | 0.05 | 0.53 |
| Sample 7 (Example) | 80 | 2 | 11 | 6 | 1 | 0.0039 | 0.02 | 0.005 | 0.05 | 0.52 |
| Sample 8 (Example) | 76 | 7 | 8 | 8 | 1 | 0.0038 | 0.02 | 0.005 | 0.05 | 0.55 |

As seen from Table 2, samples 5 to 8 have glass composition corresponding to the present disclosure and the redox ratio greater than 0.5.

Each of raw materials was mixed with the formula as shown in Table 2, and was melted by heating at the temperature of 1650° C. for 3 hours using a platinum crucible. During melting, a platinum stirrer was inserted, and glass was homogenized by stirring for 1 hour. Subsequently, the molten glass was annealed at 550° C., yielding sample glass. The resultant glass was processed to the thickness of 10 mm, 20 mm, and 40 mm.

For the fabricated glass, transmittance was tested.

Figure 13:
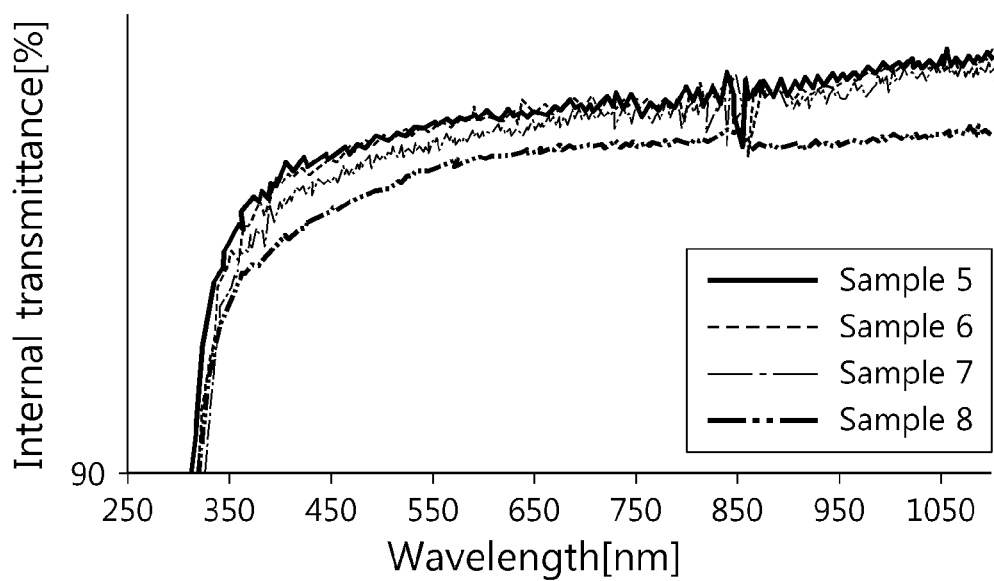
FIG. 13 is a transmittance graph of borosilicate glass according to example of the present disclosure.

FIG. 13 is a transmittance graph of borosilicate glass according to example of the present disclosure.

As can be seen from FIG. 13, it was found that glass of composition in Table 2 had the visible light (380 nm~780 nm) transmittance of 90% or more, sample 5 had the average transmittance of 92.3% in the visible light range, sample 6 had the average transmittance of 92.3%, sample 7 had the average transmittance of 92.2%, and sample 8 had the average transmittance of 92.0%. The average transmittance of all the samples was 92% or more. As described above, FIG. 13 shows good transmittance of borosilicate glass according to the present disclosure in 380 nm~780 nm. Accordingly, this glass can perform the function as a light guide plate.

Table 3 shows glass composition of example and another comparative example samples.

Each of raw materials was mixed with the formula as shown in Table 3, and was melted by heating at the temperature of 1650° C. for 3 hours using a platinum crucible. During melting, a platinum stirrer was inserted, and glass was homogenized by stirring for 1 hour. Subsequently, the molten glass was annealed at 550° C., yielding sample glass. The resultant glass was processed to the thickness of 10 mm, 20 mm, and 40 mm.

For the fabricated glass, transmittance was tested.

Figure 14:
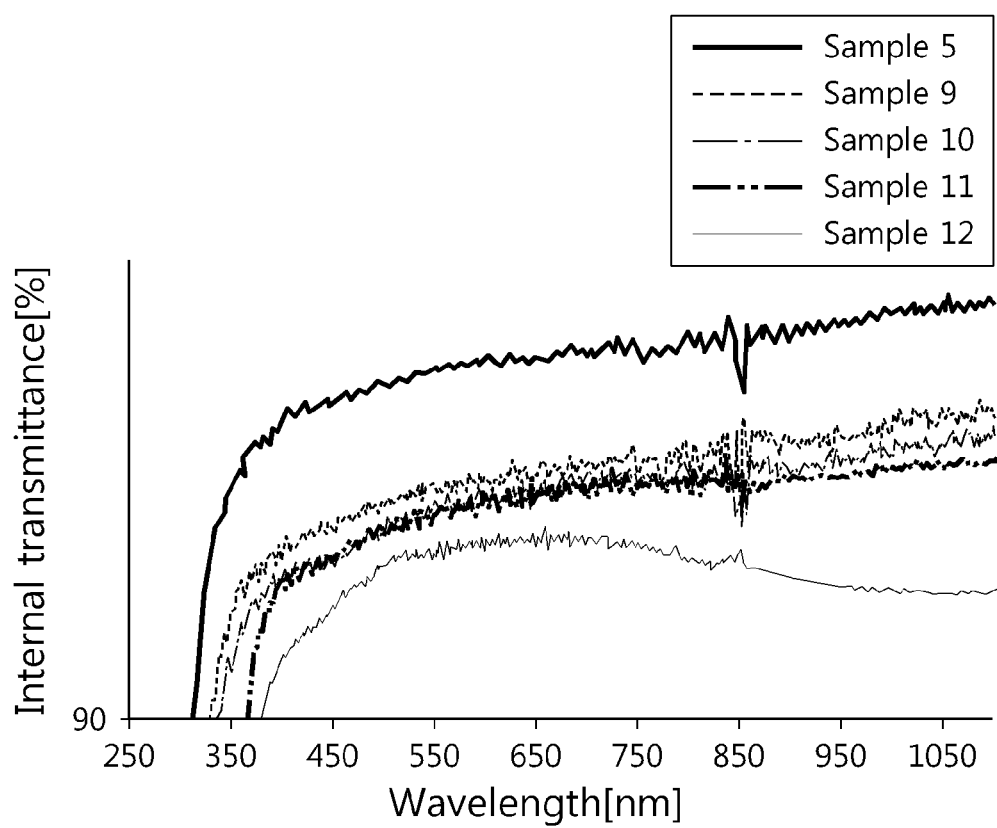
FIG. 14 is a transmittance graph of borosilicate glass according to example of the present disclosure and comparative example.

FIG. 14 is a transmittance graph of borosilicate glass according to example of the present disclosure and comparative example.

As can be seen from FIG. 14, in the composition of Table 3, glass according to comparative example has smaller transmittance than glass according to example of the present disclosure. Specifically, it was found that sample 9 had the average transmittance of 91.0% in the visible light range, sample 10 had the average transmittance of 91.4%, sample 11 had the average transmittance of 91.3%, and sample 12 had the average transmittance of 91.5%. As can also be seen from comparison with the results of FIG. 12, all comparative example glasses have smaller transmittance than glass according to example of the present disclosure.

As described above, it can be seen that glass according to the present disclosure is glass of composition showing a small color difference and good transmittance through redox ratio control. Accordingly, glass according to the present disclosure can perform the function as a light guide plate.

While the preferred embodiments of the present disclosure have been hereinabove illustrated and described, the present disclosure is not limited to the disclosed preferred embodiments, and it is obvious to those skilled in the art that

TABLE 3

| | SiO₂ wt % | Al₂O₃ wt % | B₂O₃ wt % | CaO wt % | MgO wt % | Na₂O wt % | K₂O wt % | Fe₂O₃ wt % | Cl wt % | SrO wt % | SO₃ wt % | C wt % | Redox ratio |
|---|---|---|---|---|---|---|---|---|---|---|---|---|---|
| Sample 5 (Example) | 85 | 1 | 10 | 0 | 0 | 3.0 | 1.00 | 0.0038 | 0.02 | 0 | 0.005 | 0.05 | 0.51 |
| Sample 9 (Comparative example) | 63 | 17 | 8 | 8 | 3 | 0.1 | 0.00 | 0.0037 | 0.00 | 0 | 0.005 | 0.05 | 0.56 |
| Sample 10 (Comparative example) | 62 | 15 | 0 | 0 | 4 | 14.7 | 4.21 | 0.0039 | 0.00 | 0 | 0.005 | 0.05 | 0.49 |
| Sample 11 (Comparative example) | 70 | 3 | 0 | 8 | 0 | 12.0 | 0.00 | 0.0035 | 0.00 | 7 | 0.005 | 0.05 | 0.52 |
| Sample 12 (Comparative example) | 67 | 12 | 8 | 0 | 2 | 8.0 | 0.10 | 0.0033 | 0.00 | 3 | 0.005 | 0.05 | 0.54 |

As seen from Table 3, glass composition of samples 9 to 12 is different from composition of the present disclosure. Sample 5 is example of the present disclosure and was indicated for comparison with comparative examples.

various modifications can be made to the embodiments without departing from the essence of the present disclosure to which the appended claims are entitled and such modifications fall within the scope of the appended claims.

What is claimed is:
1. Borosilicate glass, comprising:
75-85 wt % of SiO₂;

5-15 wt % of $B_2O_3$;
0-5 wt % of $Al_2O_3$;
1-7 wt % of $R_2O$ where R is at least one of Li, Na and K;
0.05 wt % to 0.1 wt % of carbon; and
>0 wt % to 0.005 wt % of $Fe_2O_3$,
wherein the borosilicate glass:
has a redox ratio of 0.5 or more, and
does not substantially contain $Cr_2O_3$.

2. The borosilicate glass according to claim 1, wherein R is K and $K_2O$ is present in an amount >0.1 wt %.

3. The borosilicate glass according to claim 1, wherein the $B_2O_3$ is present in an amount of 11-15 wt %.

4. The borosilicate glass according to claim 1, wherein the carbon is present in an amount of 0.05 wt %.

5. The borosilicate glass according to claim 1, further comprising:
0.001-0.05 wt % of sulfur.

6. The borosilicate glass according to claim 1, further comprising 0.005 wt % to 0.5 wt % of $SO_3$ or Cl as a fining agent.

7. The borosilicate glass according to claim 1, wherein the redox ratio is 0.5-0.8.

8. The borosilicate glass according to claim 1, wherein the borosilicate glass does not substantially contain NiO, CuO, $V_2O_5$ or MnO.

9. A light guide plate comprising borosilicate glass defined in claim 1.

10. The light guide plate according to claim 9, wherein at a site 500 mm away from a light-input portion (i.e., path length 500 mm), a color difference is +0.015 to −0.015.

11. The light guide plate according to claim 10, wherein at a site 500 mm away from the light-input portion (i.e., path length 500 mm), a color difference is +0.010 to −0.010.

12. A method for fabricating borosilicate glass, comprising:
mixing and melting glass raw materials 75-85 wt % of $SiO_2$, 5-15 wt % of $B_2O_3$, 0-5 wt % of $Al_2O_3$, 1-7 wt % of $R_2O$, 0.05 wt % up to 0.1 wt % carbon, and >0 wt % up to 0.005 wt % of $Fe_2O_3$, where R is at least one of Li, Na and K; and
carrying out forming of the melted glass raw materials by a float method using a molten tin float bath,
wherein the borosilicate glass has a redox ratio of 0.5 or more.

13. The method for fabricating borosilicate glass according to claim 12, wherein the glass raw materials further comprise 0.001-0.05 wt % of sulfur.

14. The method for fabricating borosilicate glass according to claim 12, wherein the redox ratio is 0.5-0.8.

15. The method for fabricating borosilicate glass according to claim 12, wherein the method comprises annealing the borosilicate glass while maintaining the redox ratio of the melted glass raw materials, after carrying out forming.

16. The method for fabricating borosilicate glass according to claim 15, wherein the annealing rate is 10° C./min-40° C./min.

* * * * *